US010482958B2

United States Patent
Lu et al.

(10) Patent No.: US 10,482,958 B2
(45) Date of Patent: Nov. 19, 2019

(54) RRAM-BASED MONOTONIC COUNTER

(71) Applicant: Taiwan Semiconductor Manufacturing Co., Ltd., Hsin-Chu (TW)

(72) Inventors: Shih-Lien Linus Lu, Hsinchu (TW); Yu-Der Chih, Hsin-Chu (TW); Chung-Cheng Chou, Hsin-Chu (TW); Tong-Chern Ong, Chong-Her (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 15/898,119

(22) Filed: Feb. 15, 2018

(65) Prior Publication Data

US 2019/0035458 A1 Jan. 31, 2019

Related U.S. Application Data

(60) Provisional application No. 62/538,989, filed on Jul. 31, 2017.

(51) Int. Cl.
| | |
|---|---|
| *G11C 13/00* | (2006.01) |
| *G06F 21/64* | (2013.01) |
| *G06F 12/14* | (2006.01) |
| *G06F 21/79* | (2013.01) |
| *G11C 7/24* | (2006.01) |

(52) U.S. Cl.
CPC ...... *G11C 13/0038* (2013.01); *G06F 12/1425* (2013.01); *G06F 21/64* (2013.01); *G06F 21/79* (2013.01); *G11C 13/0004* (2013.01); *G11C 13/0059* (2013.01); *G11C 13/0069* (2013.01); *G11C 7/24* (2013.01); *G11C 2013/0083* (2013.01); *G11C 2213/79* (2013.01)

(58) Field of Classification Search
CPC .. G11C 11/5642; G11C 11/5635; G11C 16/22
USPC ...................................... 365/185.03
See application file for complete search history.

(56) References Cited

U.S. PATENT DOCUMENTS

2009/0290411 A1* 11/2009 Xi .................. G11C 11/5664
365/163

* cited by examiner

*Primary Examiner* — Anthan Tran
(74) *Attorney, Agent, or Firm* — Duane Morris LLP (57) ABSTRACT

A circuit includes a memory array having a plurality of memory cells; a control logic circuit, coupled to the memory array, and configured to use a first voltage signal to cause a first memory cell of the plurality of memory cells to transition from a first resistance state to a second resistance state, and a second voltage signal to cause the first memory cell to transition from the second resistance state to a third resistance state; and a counter circuit, coupled to the control logic circuit, and configured to increment a count by one in response to the first memory cell's transition from the first to the second resistance state, and again increment the count by one in response to the first memory cell's transition from the second to the third resistance state.

20 Claims, 3 Drawing Sheets

RRAM-BASED MONOTONIC COUNTER

CROSS-REFERENCE TO RELATED APPLICATION

The present application claims priority to U.S. Provisional Patent Application No. 62/538,989, filed on Jul. 31, 2017, which is incorporated by reference herein in its entirety.

BACKGROUND

Monotonic counters are typically used in computer systems to maintain a count that can only be incremented, or decremented, over a respective lifetime of the counter, i.e., the count of the monotonic counter can only vary in one direction. Monotonic counters help ensure, for example, a prior count or an event based on a prior count will not happen again. Monotonic counters may be used, for example, for assigning unique numbers or identifiers.

For example, monotonic counters can be used in a pre-paid cash card. In general, such a pre-paid cash card includes a balance value that reflects a current remaining amount of a previously deposited amount of cash. Every time the pre-paid cash card is used by a respective user for purchase, such a balance value should decrease accordingly. In some cases, however, a hacker or malicious user can make a backup of a balance value during, or after, a previous purchase, and repeat replacing a current balance value with the backup. As such, the hacker or malicious user may never run out of a "backup" balance value, which is typically known as a rewind attack, or a backup attack. In this regard, the monotonic counter is typically integrated into such a cash card to generate a unique count, which is incremented by one every time the user uses the cash card. Since such a count provided by the monotonic counter cannot be reversed or altered, a merchant may rely on the count to detect whether a backup attack occurs.

In general, various one-time programmable memory devices (e.g., eFuse devices, anti-eFuse devices, etc.) are employed by conventional monotonic counters to provide such counts because of their non-reversible characteristics. However, a respective lifetime of the conventional monotonic counter is typically limited by a respective number of such one-time programmable memory devices. In other words, every time the conventional monotonic counter provides an updated count, a respective one of the one-time programmable memory devices is nullified (i.e., cannot be used), which disadvantageously limits the lifetime of the conventional monotonic counter. Thus, conventional monotonic counters using one-time programmable memory devices have not been entirely satisfactory.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides various embodiments of an authentication circuit including a resistive random access memory (RRAM)-based monotonic counter circuit. In some embodiments, the authentication circuit includes a plurality of RRAM cells formed as an array. The RRAM-based monotonic counter circuit uses each RRAM cell's transition from a resistance state to another resistance state to provide a count that cannot be altered and reversed. More specifically, in some embodiments, the disclosed authentication circuit varies voltage/current levels of respective signals applied to each RRAM cell so as to cause each RRAM cell to present at least three resistance states. When an RRAM cell transitions from a first resistance state to a second resistance state, the RRAM-based monotonic counter accordingly increments the count by one; and when the RRAM cell transitions form the second resistance state to a third resistance state, the RRAM-based monotonic counter accordingly increments the count by another one. Moreover, when the RRAM cell transitions to the third resistance state, in some embodiments, the RRAM cell may remain at the third resistance state, i.e., non-reversible to either the second or first resistance state.

As such, the RRAM-based monotonic counter of the disclosed authentication circuit can double a number of counts when compared to the conventional monotonic counter, as mentioned above, while keeping the count nonalterable and non-reversible. Accordingly, a respective lifetime of the RRAM-based monotonic counter of the authentication circuit can be substantially extended up to two times, which in turn improves respective reliability of the authentication circuit.

Figure 1:
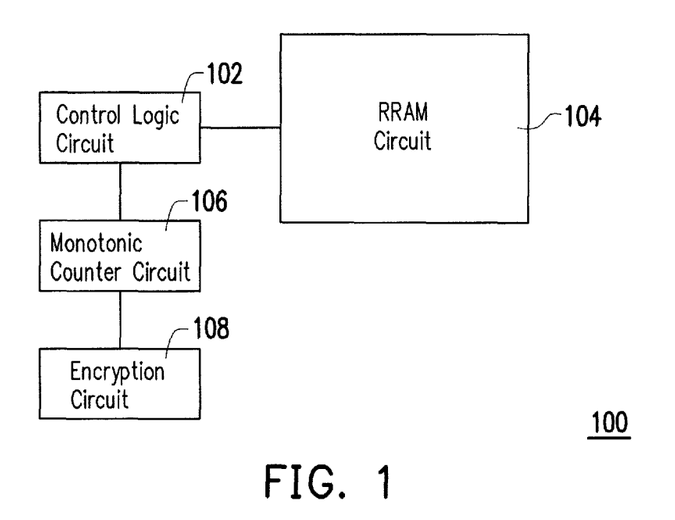
FIG. 1 illustrates a block diagram of an authentication circuit comprising a monotonic counter circuit, in accordance with some embodiments.

FIG. 1 illustrates a block diagram of an authentication circuit 100, in accordance with various embodiments. The authentication circuit 100 includes a control logic circuit 102, an RRAM circuit 104, an RRAM-based monotonic counter circuit 106, and an encryption circuit 108. For brevity, the RRAM-based monotonic counter circuit 106 is herein referred to as monotonic counter circuit 106. The RRAM circuit 104 includes a plurality of RRAM cells formed as an array, and one or more driver circuits and input/output (I/O) circuits coupled to the plurality of RRAM cells, which will be discussed in further detail below with respect to FIG. 2.

In some embodiments, the control logic circuit 102, coupled to the RRAM circuit 104, is configured to use the one or more deriver circuits of the RRAM circuit 104 to cause each of the RRAM cells to transition from a first resistance state, to a second resistance state, and then to a third resistance state. The control logic circuit 102 is further configured to use the I/O circuits of the RRAM circuit 104 to determine which of the resistance states each RRAM cell currently presents, and determine whether to update a count that the monotonic counter circuit 106 presents based on a presence of transition of resistance states. For example, when the control logic 102 determines that an RRAM cell has transitioned from respective first resistance state to second resistance state or from respective second resistance state to third resistance state, the control logic 102 may cause the monotonic counter circuit 106 to increment the count by one, which will be discussed in further detail below with respect to FIG. 4.

In some embodiments, the encryption circuit 108, coupled to the monotonic counter circuit 106, may use the most updated value of the count, together with a varying balance value, to provide an encrypted value. More specifically, in some embodiments, the encrypted value may be generated by using one of various cryptographic techniques such as, for example, a public-key cryptographic algorithm (e.g., Diffie-Hellman key exchange, Digital Signature Algorithm, Rivest-Shamir-Adelman Algorithm, etc.), a quantum cryptographic technique, or the like. For example, when the authentication circuit 100 is employed by a pre-paid cash card, the varying balance value may include a balance amount of the pre-paid cash card. And according to some embodiments, the encryption circuit 108, may generate the encrypted value using the most updated count provided by the monotonic counter circuit 106. As such, the encrypted value is unique and non-copyable (because of the non-reversible characteristic of the count). A merchant may use such an encrypted value to determine whether the above-mentioned backup attack occurs.

Figure 2:
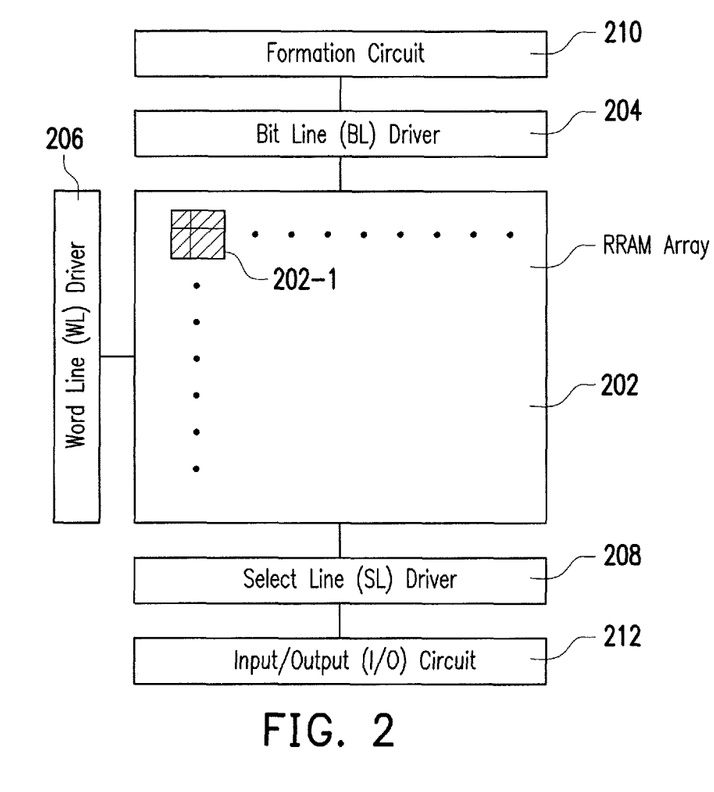
FIG. 2 illustrates a block diagram of a resistive random access memory (RRAM) circuit of the authentication circuit of FIG. 1, in accordance with some embodiments.

FIG. 2 illustrates a block diagram of the RRAM circuit 104, in accordance with various embodiments. As shown, the RRAM circuit 104 includes an RRAM array 202 having a plurality of RRAM cells, e.g., 202-1, a bit line (BL) driver 204, a word line (WL) driver 206, a select line (SL) driver 208, a formation circuit 210, and an input/output (I/O) circuit 212. Although in the illustrated embodiment of FIG. 2, the RRAM array 200 includes only one RRAM cell 202-1, it is understood that the RRAM array 200 may include any desired number of RRAM cells while remaining within the scope of the present disclosure.

In some embodiments, each RRAM cell (e.g., 202-1) of the RRAM array 202 includes a resistor with variable resistance and a transistor coupled, in series, to the resistor, which is typically known as a 1-transistor 1-resistor (1T1R) RRAM configuration. As such, each RRAM cell may include three terminals that are each coupled to a bit line (BL), a word line (WL), and a selector line (SL), respectively. Such a 1T1R RRAM configuration will be described in further detail with respect to FIG. 3.

As will be discussed in further detail below with respect to FIG. 4, in some embodiments, the plurality of RRAM cells of the RRAM array 202 are arranged in a column-row configuration, wherein the RRAM array 202 includes a plurality of BL's that are arranged along a vertical direction (i.e., the column), and pluralities of WL's and SL's that are arranged along a horizontal direction (i.e., the row) that is perpendicular to the vertical direction. Further, each BL intersects with plural pairs of WL's and SL's, and at each intersection, an RRAM cell is coupled to respective BL, WL, and SL.

Further, in some embodiments, the RRAM cells of the RRAM array 202 are each coupled to the BL driver 204, the WL driver 206, the SL driver 208 through the respective BL, WL, and SL. In some embodiments, the BL driver 204 may include one or more multiplexers, switch devices, and/or the like that are each configured to select one or more of the BL's so as to assert respectively coupled RRAM cell(s). Similarly, the WL driver 206 and the SL driver 208 may each include one or more multiplexers, switch devices, and/or the like that are each configured to select one or more of the WL's and SL's so as to assert coupled RRAM cell(s), respectively. In some embodiments, through the respective BL, each RRAM cell may be further coupled to the formation circuit 210. The formation circuit 210 may include one or more voltage source circuits and/or current source circuits that are configured to cause each RRAM cell to transition among respective different resistance states by applying different voltage/current signals, which will be discussed in further detail below with respect to FIG. 4.

In accordance with various embodiments, each of the RRAM cells of the RRAM array 202 may be further coupled to the I/O circuit 212 through the respective BL. The I/O circuit 212 includes a plurality of sensing amplifiers (SA's) that are each configured to determine (e.g., read) the respective resistance state of each of the RRAM cells of the RRAM array 202. In some embodiments, such a determined resistance state may be provided to the control logic circuit 102 (FIG. 1) to determine whether to update the monotonic counter circuit 106's count, as described above in accordance with some embodiments. In some embodiments, the control logic circuit 102 (FIG. 1) may be coupled to the BL driver 204, the WL driver 206, the SL driver 208, the formation circuit 210, and the I/O circuit 212, and is configured to control each of them, which will be discussed in further detail below with respect to FIG. 4.

Figure 3:
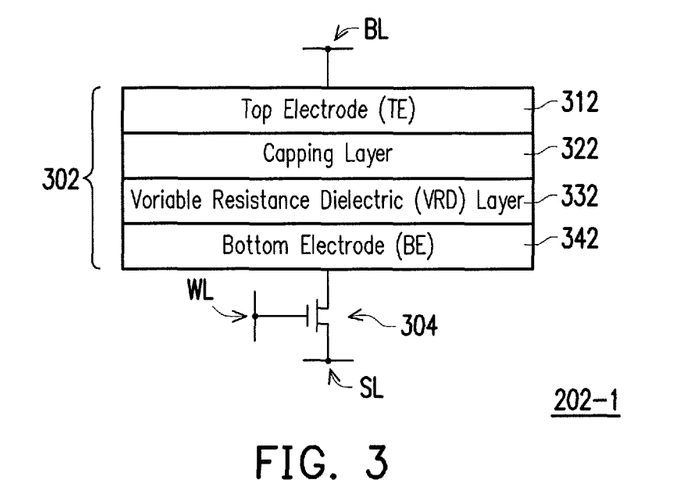
FIG. 3 illustrates an exemplary configuration of an RRAM cell of the RRAM circuit of FIG. 2, in accordance with some embodiments.

FIG. 3 illustrates an exemplary configuration of the RRAM cell 202-1 of the RRAM array 202 (FIG. 2), in accordance with some embodiments. As described above, the RRAM cell 202-1 is implemented as a 1T1R RRAM configuration, for example, a resistor 302 with variable resistance is serially connected to a transistor 304. In some other embodiments, however, any of a variety of RRAM configurations that exhibits the characteristic of variable resistance may be used by the RRAM cell of the RRAM array 202 such as, for example, a 1 diode-1 resistor (1D-1R) configuration, a 1 transistor-many resistors (1T-manyR)

configuration, a cross-bar configuration, etc., while remaining within the scope of the present disclosure.

In some embodiments, the resistor 302 is formed as a multi-layer stack that includes a top electrode (TE) 312, a capping layer 322, a variable resistance dielectric (VRD) layer 332, and a bottom electrode (BE) 342. In some embodiments, the TE 312 may be formed from at least one of the materials selected from: Pt, TiN/Ti, TiN, Ru, Ni, and combinations thereof; the capping layer 322 may be formed from at least one of the transition metal materials such as, Ti, Ni, Hf, Nb, Co, Fe, Cu, V, Ta, W, Cr, and combinations thereof; the VRD layer 332 may be formed from at least one of the transition metal oxide materials such as, $TiO_x$, $NiO_x$, $HfO_x$, $NbO_x$, $CoO_x$, $FeO_x$, $CuO_x$, $VO_x$, $TaO_x$, $WO_x$, $CrO_x$, and combinations thereof; and the BE 342 may be formed of at least one of the materials selected from: TiN, TaN, W, Pt, and combinations thereof. In some embodiments, the VRD layer 332 may include a high-k dielectric layer. In general, the VRD layer 332 may be formed by deposition, for example, atomic layer deposition (ALD), chemical vapor deposition (CVD), meta-organic chemical vapor deposition (MOCVD), etc., to have a particular thickness and crystalline structure using a particular manufacturing process recipe.

As described above, each RRAM cell further includes a transistor coupled to the respective resistor, in series. In some embodiments, such a transistor is typically referred to as a "selection transistor," or an "enablement transistor" that is configured to enable a conduction path to flow through the coupled resistor. As shown in FIG. 3, the selection transistor 304 is coupled to the resistor 302, in series. Further, in some embodiments, the TE 312 is coupled to a respective BL and is configured to receive various voltage signals (e.g., a set voltage signal, a negative set signal, which will be discussed below) from the formation circuit (FIG. 2). And a drain of the selection transistor 304 is coupled to the BE 342, a gate of the selection transistor 304 is coupled to a respective WL and is configured to receive one or more WL assertion signals so as to enable the RRAM cell 202-1 to be accessed, and a source of the selection transistor 304 is coupled to a respective SL and is configured to receive a reference voltage signal (e.g., ground) with respect to the voltage signal received at the TE 312.

In some embodiments, before operating the RRAM cell 202-1, the RRAM cell 202-1 is "unformed." The term "unformed" as used herein refers to an RRAM cell's resistor presenting a high resistance state (FIRS). For example, when the RRAM cell 202-1 is in the FIRS, the RRAM cell 202-1 may present a resistance value, which ranges between about 10 and about 100 kilo ohm. In some embodiments, such an unformed RRAM cell 202-1 may be provided when the RRAM cell 201-1 is not yet being applied by any stress, e.g., voltage/current signals.

To operate the RRAM cell 202-1, the selection transistor 304 is activated (i.e., turned on) by an assertion signal through the respective WL, and then a first voltage signal with a first polarity (e.g., BL is provided with a positive voltage and SL is ground) is applied across the RRAM cell 202-1. As such, the higher voltage at BL (and TE 312) pulls negatively charged oxygen ions from the VRD layer 332 to the capping layer 322 and thus leaves oxygen vacancies within the VRD layer 332, which allows electron(s) present in the BE 342 to travel (e.g., hop) from the BE 342 through the VRD layer 332 and capping layer 332, respectively, and ultimately to the TE 312. Consequently, a first conduction path through the VRD layer 332 is "formed." Before such a first conduction path is formed, as mentioned above, the resistor 302 remains at the HRS, and, upon formation of the first conduction path, the resistor 302 transitions from the HRS to a low resistance state (LRS), and a relatively higher magnitude of current flows between the BL and the SL. For example, when the RRAM cell 202-1 is in the LRS, the RRAM cell 202-1 may present a substantially lower resistance value when compared to the HRS, which ranges between about 10 and about 20 kilo ohm.

In some embodiments, while keeping the selection transistor 304 turned on, a second voltage signal with a second polarity (e.g., SL is provided with a positive voltage and BL is ground) is applied across the RRAM cell 202-1. As such, the higher voltage at SL pulls oxygen ions back from the capping layer 322 to the VRD layer 332, and thus fill some of oxygen vacancies at the VRD layer 332, which prevents electron(s) that are present in the BE 342 to travel (e.g., hop) from the BE 342 through the layers 332 and 322 to the TE 312, Accordingly, the first conduction path disappears so that the resistor 302 transitions back to the HRS state and a lower magnitude of current flows from the SL to BL.

In general, when a higher positive voltage, for example, the above-described first voltage signal, is applied at the BL than the voltage at the SL, the VRD layer 332 exhibits a lower resistivity because of the formation of a conduction path (e.g., the above-described first conduction path), which causes the RRAM cell 202-1 to be at the LRS. Accordingly, the voltage applied across the RRAM cell 202-1 is typically referred to as a "set" voltage of the RRAM cell 202-1. On the other hand, when a higher positive voltage applied at the SL than the voltage at the BL (i.e., a negative voltage is applied across the RRAM cell 202-1 with respect to the TE 312), for example, the above-described second voltage signal, the VRD layer 332 exhibits a higher resistivity because of the lack of the first conduction path, which causes the RRAM cell 202-1 to transition back to the HRS. Accordingly, the voltage applied across the RRAM cell 202-1 is typically referred to as a "reset" voltage of the RRAM cell 202-1. With further increasing the voltage level of the reset voltage (i.e., a more negative voltage is applied across the RRAM cell 202-1 with respect to the TE 312), in some embodiments, an increasing number of defects may migrate from the BE 342, through the VRD layer 332 and the capping layer 322, and to the TE 312, which causes a second conduction path to be formed across the VRD layer 332. When such a second conduction path is formed, the VRD layer 332 exhibits an even lower resistivity, which in turn causes the RRAM cell 202-1 to transition to a very low resistance state (VLRS). For example, when the RRAM cell 202-1 is in the VLRS, the RRAM cell 202-1 may present a substantially lower resistance value when compared to the LRS, which ranges between about 1 and about 10 ohm. Such a voltage applied across the RRAM cell 202-1 is typically referred to as a "negative set" voltage of the RRAM cell 202-1. In some embodiments, once the RRAM cell 202-1 transitions to the VLRS, the RRAM cell 202-1 cannot transition back to either the LRS or FIRS. Alternative stated, the RRAM cell 202-1 is non-reversible to either the LRS or HRS, which is particularly, but not exclusively, useful for the RRAM cell 202-1 to be used in a monotonic counter.

In accordance with some embodiments of the present disclosure, the authentication circuit 100 (FIG. 1) uses such three resistance states (the HRS, LRS, and VLRS) of each RRAM cells of the RRAM array 202 to increase the number of counts of the monotonic counter circuit 106 so as to extend the respective lifetime. In particular, when a respective "set" voltage is applied to an RRAM cell, the RRAM cell transitions from respective HRS to LRS, which causes the count to be incremented by one. When a respective negative set voltage is applied to the RRAM cell, the RRAM cell transitions from the LRS to a respective VLRS, which causes the count to be incremented by another one. That is, each RRAM cell can account for two counts. As such, when the monotonic counter circuit 106 uses the RRAM array 202 to update the respective count, the number of counts may be about twice the RRAM array 202's number of the RRAM cells. Moreover, when each RRAM cell transitions to the VLRS (e.g., accounting for two counts), the RRAM cell cannot transition back to either the HRS or LRS, which further improves security of the authentication circuit 100 because the count is not reversible. Operations of the authentication circuit 100 will be discussed in further detail below with respect to FIG. 4.

Figure 4:
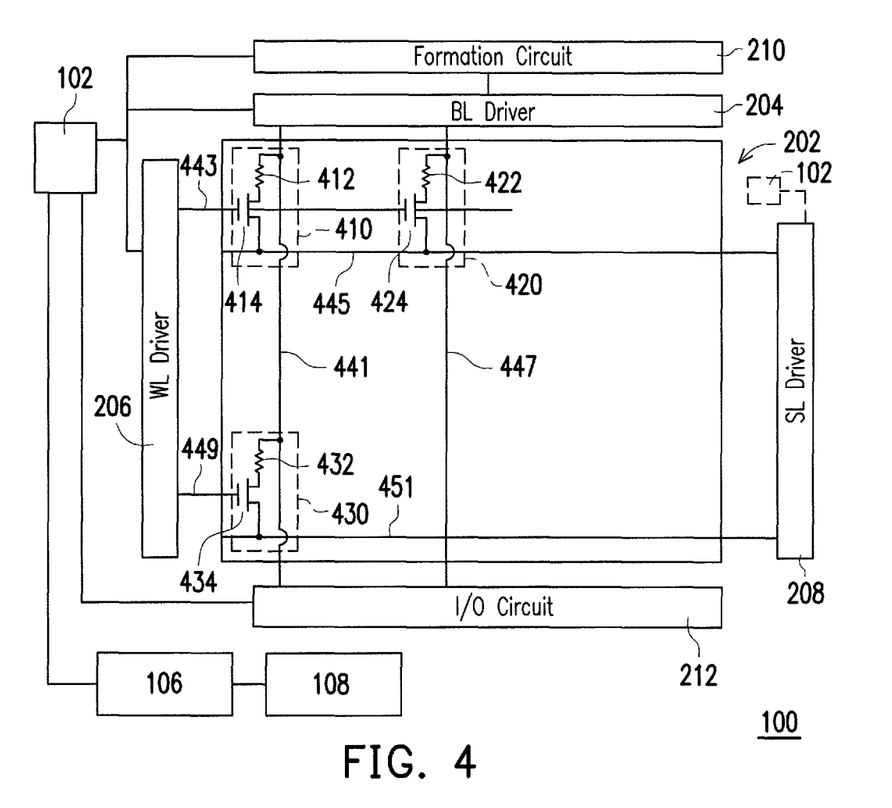
FIG. 4 illustrates a hybrid circuit and block diagram of the authentication circuit of FIG. 1, in accordance with some embodiments.

FIG. 4 illustrates a hybrid circuit and block diagram of the authentication circuit 100, in accordance with various embodiments. As mentioned above, the RRAM array 202 includes any desired number of RRAM cells arranged in a column-row configuration. In the illustrated embodiment of FIG. 4, the RRAM array 202 includes three RRAM cells 410, 420, and 430, for purposes of illustration, that are disposed in a respective location of the RRAM array 202. Each of the RRAM cells in the RRAM array 202 is substantially similar to the above-discussed RRAM cell 202-1 (FIG. 3).

Accordingly, the RRAM cell 410 includes serially coupled resistor 412 and selection transistor 414; the RRAM cell 420 includes serially coupled resistor 422 and selection transistor 424; and the RRAM cell 430 includes serially coupled resistor 432 and selection transistor 434, wherein each of the resistors 412, 422, and 432 is substantially similar to the resistor 302 of the RRAM cell 202-1 and each of the selection transistors 414, 424, and 434 is substantially similar to the selection transistor 304 of the RRAM cell 202-1.

Further, the RRAM cell 410 is coupled to the BL driver 204, the WL driver 206, and the SL driver 208, through BL 441, WL 443, and SL 445, respectively; the RRAM cell 420 is coupled to the BL driver 204, the WL driver 206, and the SL driver 208, through BL 447, WL 443, and SL 445, respectively; and the RRAM cell 430 is coupled to the BL driver 204, the WL driver 206, and the SL driver 208, through BL 441, WL 449, and SL 451, respectively.

In some embodiments, the RRAM cells 410 and 420 are coupled to the WL driver 206 and the SL driver 208 through common WL 443 and SL 445. In other words, RRAM cells 410 and 420 are arranged along a common first row. Although only two RRAM cells (e.g., 410 and 420) are shown along such a first row, any desired number of RRAM cells may be disposed along the first row, wherein each of RRAM cells along the first row is coupled to the WL driver 206 and SL driver 208 through common WL 443 and SL 445 but to the BL driver 204 with a respective BL. Similarly, the RRAM cells 410 and 430 are coupled to the BL driver 204 and the I/O circuit 212 through a common BL 441. In other words, the RRAM cells 410 and 430 are arranged along a common first column. Although only two RRAM cells (e.g., 410 and 430) are shown along such a first column, any desired number of RRAM cells may be disposed along the first column, wherein each of RRAM cells along the first column is coupled to the BL driver 204 and I/O circuit 212 through the common BL 441 but to the WL driver 206 and SL driver 208 with respective WL and SL.

In some embodiments, before the authentication circuit 100 is first used, the monotonic counter circuit 106 may start its count from 0, and each of the RRAM cells (e.g., 410, 420, 430, etc.) of the RRAM array 202 may be "unformed." As described above with respect to FIG. 3, when the RRAM cell is unformed, the RRAM cell presents the HRS. Subsequently, when the authentication 100 is used, which may be triggered by an event (e.g., a user is using a pre-paid cash card including the authentication circuit 100 for making a first payment), the control logic circuit 102 may use the WL driver 206 to provide a WL assertion signal to select a first WL (i.e., a first row of the RRAM array 202) so as to activate respective selection transistors of the RRAM cells along the selected first row, and use the SL driver 208 to select a corresponding SL along the first row. Concurrently or subsequently, the control logic circuit 102 uses the BL driver 204 to select a particular BL. As such, a particular RRAM cell is selected.

Using the RRAM cell 410 as an example, the control logic circuit 102 asserts the WL 443, through the WL driver 206, to activate the selection transistor 414, and then asserts the SL 445 and BL 441 through the SL driver 208 and the BL driver 204, respectively. The control logic circuit 102 then uses the formation circuit 210 to apply a respective "set" voltage across the RRAM cell 410. In some embodiments, such a set voltage may be a positive value. In other words, the positive set voltage is applied to the terminal of the resistor 412 of the RRAM cell 410 that is coupled to the BL 441, and a source end of the transistor 414 of the RRAM cell 410 is coupled to ground. Based on the operation principle of the RRAM cell 202-1, as described above with respect to FIG. 3, when the set voltage is applied across the RRAM cell 410, the RRAM cell 410 may transition from the HRS to LRS. Accordingly, a respective current level of a current signal flowing through the RRAM cell 410 may be substantially increased, when compared to the RRAM cell 410 in the HRS.

In some embodiments, the control logic unit 102 uses the I/O circuit 212 to determine whether the RRAM cell 410 has successfully transitioned from the HRS to LRS by comparing either the current signal flowing through the RRAM cell 410 or a voltage signal present on the BL 441 to a reference signal. For example, the I/O circuit 212 may include a first sensing amplifier having first and second input terminals. The first input terminal is coupled to the BL 441 so as to receive either the current signal (flowing through the RRAM cell 410) or the voltage signal (present on the BL 441), and the second input terminal is coupled to a reference cell, similar to the 1T1R RRAM configuration, whose resistor has a constant resistivity that is about the same as the resistivity of the resistor 412 of the RRAM cell 410 when the RRAM cell 410 is in the HRS. As such, the first sensing amplifier of the I/O circuit 212, which can be a current or a voltage sensing amplifier, can compare the current/voltage signal with the reference signal received at the first and second input terminals, respectively, to determine whether the RRAM cell 410 has transitioned from the HRS to LRS.

In some embodiments, if the I/O circuit 212 determines that the RRAM cell 410 has transitioned from the HRS to LRS, the control logic circuit 102 may acknowledge such a transition, and cause the monotonic counter circuit 106 to increment the count, for example, from 0 to 1. Accordingly, the encryption circuit 108 may use such an updated count, together with a current balance value of the pre-paid cash card including the authentication circuit 100 (e.g., a remaining balance of the pre-paid cash card, for example, $50, after the user makes the first payment), to provide a first updated encrypted value (e.g., an encrypted value based on the remaining balance $50 and the count "1").

Subsequently, when the authentication 100 is again used, which may be triggered by another event (e.g., the user is using the pre-paid cash card for making a second payment), the control logic circuit 102 may follow the above-described operations to select the RRAM cell 410 but cause the formation circuit 210 to apply a respective "negative set" voltage across the RRAM cell 410.

In some embodiments, such a negative set voltage may be a negative value. In other words, the negative set voltage is applied to the terminal of the resistor 412 of the RRAM cell 410 that is coupled to the BL 441, and a source end of the transistor 414 of the RRAM cell 410 is coupled to ground. Based on the operation principle of the RRAM cell 202-1, as described above with respect to FIG. 3, when the negative set voltage is applied across the RRAM cell 410, the RRAM cell 410 may transition from the LRS to VLRS. Accordingly, the current level of the current signal flowing through the RRAM cell 410 may be further increased, when compared to the RRAM cell 410 in the LRS. Similarly, the I/O circuit 212 may use a second sensing amplifier to determine whether the RRAM cell 410 has successfully transitioned from the LRS to VLRS.

For example, the second sensing amplifier may have one input terminal coupled to the BL 441 and the other input terminal coupled to another reference cell, similar to the 1T1R RRAM configuration, whose resistor has a constant resistivity that is about the same as the resistivity of the resistor 412 of the RRAM cell 410 when the RRAM cell 410 is in the LRS. As such, the second sensing amplifier of the I/O circuit 212 can follow the operation similar to the first sensing amplifier to determine whether the RRAM cell 410 has transitioned from the LRS to VLRS.

If the I/O circuit 212 determines that the RRAM cell 410 has transitioned from the LRS to VLRS, the control logic circuit 102 may acknowledge such a transition, and cause the monotonic counter circuit 106 to further increment the count, for example, from 1 to 2. Accordingly, the encryption circuit 108 may use such an updated count, together with the remaining balance of the pre-paid cash card, for example, $20, after the user makes the second payment, to provide a second updated encrypted value (e.g., an encrypted value based on the remaining balance $20 and the count "2").

As mentioned above, since the count cannot be reversed or altered, a merchant may rely one this count provided by the authentication circuit 100 to determine whether one of the above-mentioned backup attacks has occurred. For example, the user may make a backup of the previous remaining balance, or even the previous encrypted value, and replace current remaining balance or encrypted value with the previous one. However, since every time the user uses the pre-paid cash card the count non-reversibly increments by one, even though the user replaces the current encrypted value with the backup, a merchant can detect such a backup attack based on a mismatch between a current count and a previous count that can be de-encrypted from the backup.

In some other embodiments, instead of using the RRAM cell 410's transition from the LRS to VLRS to account for the increment of count (from 1 to 2 in the above example), the control logic circuit 102 may use the BL driver 204 to select the RRAM cell 420 and use the formation circuit 210 to apply a respective set voltage across the RRAM cell 420 so as to cause the RRAM cell 420 to transition from the HRS to LRS. And the control logic circuit 102 uses the RRAM cell 420's transition from the HRS to LRS to cause the monotonic counter circuit 106 to increment the count from 1 to 2.

Figure 5:
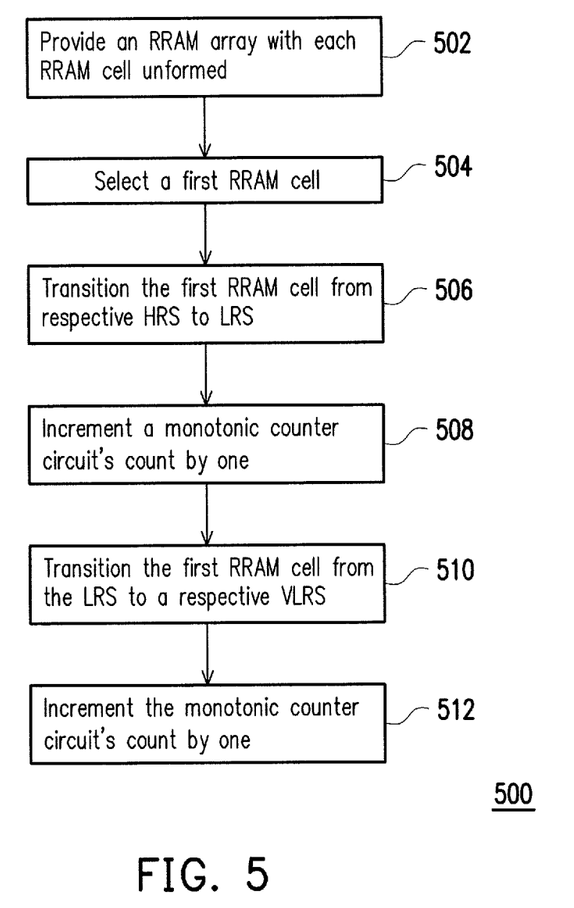
FIG. 5 illustrates a flow chart of an exemplary method to operate the authentication circuit of FIG. 1, in accordance with some embodiments.

FIG. 5 illustrates a flow chart of a method 500 to operate the authentication circuit 100 (FIG. 1), in accordance with various embodiments. In various embodiments, the operations of the method 500 are performed by the respective components illustrated in FIGS. 1-4. For purposes of discussion, the following embodiment of the method 500 will be described in conjunction with FIGS. 1-4. It is noted that the illustrated embodiment of the method 500 is merely an example. Therefore, it should be understood that any of a variety of operations may be omitted, re-sequenced, and/or added while remaining within the scope of the present disclosure.

The method starts with operation 502 in which an RRAM array including a plurality of RRAM cells that are each unformed is provided, in accordance with various embodiments. As mentioned above, when an RRAM cell is unformed, such an RRAM cell may present a HRS. Using the RRAM array 202 as an example, each of the RRAM cells (e.g., 410, 420, 430, etc.) of the RRAM array 202 is unformed so that each RRAM cell is in the HRS.

Next, at operation 504, a first RRAM cell of the RRAM array is selected, in accordance with various embodiments. Continuing with the above example, the RRAM cell 410 is selected by the control logic circuit 102 through the WL driver 206, the SL driver 208, and the BL driver 204 asserting the RRAM cell 410's respective WL 443, SL 445, and BL 441.

Next, at operation 506, the selected first RRAM cell 410 is transitioned from the HRS to a respective LRS, in accordance with various embodiments. Still using the above example, after the RRAM cell 410 is selected, the control logic circuit 102 uses the formation circuit 210 to apply a respective set voltage across the RRAM cell 410 so as to cause the RRAM cell 410 to transition from the HRS to LRS.

Next, at operation 508, a count of a monotonic counter circuit is accordingly incremented by one, in accordance with various embodiments. Still with the above example, in response to the RRAM cell 410's transition from the HRS to LRS, the control logic circuit 102 increments the count of the monotonic counter circuit 106 by one. In some embodiments, the monotonic counter circuit 106 may provide such an updated count to the coupled encryption circuit 108, and the encryption circuit 108 may use the updated count, together with a current balance value, to provide an encrypted value.

At operation 510, the selected first RRAM cell transitions from the LRS to a respective VLRS, in accordance with various embodiments. Still using the above example, after the RRAM cell 410 transitions to the LRS, the control logic circuit 102 uses the formation circuit 210 to apply a respective negative set voltage across the RRAM cell 410 so as to cause the RRAM cell 410 to transition from the LRS to VLRS. In some embodiments, once any of the RRAM cells of the RRAM array 202 transitions to the VLRS, such an RRAM cell cannot transition back to either the LRS or HRS.

Next, at operation 512, the count of the monotonic counter circuit is incremented by one again, in accordance with various embodiments. In response to the RRAM cell 410's transition from the LRS to VLRS, the control logic circuit 102 increments the count of the monotonic counter circuit 106 by one. In some embodiments, the monotonic counter circuit 106 may provide such an updated count to the coupled encryption circuit 108, and the encryption circuit 108 may use the updated count, together with a current balance value, to provide another encrypted value.

In some embodiments, the method 500 may continue to further operations to select another RRAM cell of the RRAM array, which is similar to operation 504, and perform the similar procedures as described with respect to operations 506-508 to increment the count by yet another one, and operations 510-512 to increment the count by yet another one. Analogously, the operations 504-512 of the method 500 may be iteratively performed by any desired number of times until all the RRAM cells of the RRAM array have each transitioned to a respective VLRS.

In an embodiment, a circuit includes a memory array having a plurality of memory cells; a control logic circuit, coupled to the memory array, and configured to use a first voltage signal to cause a first memory cell of the plurality of memory cells to transition from a first resistance state to a second resistance state, and a second voltage signal to cause the first memory cell to transition from the second resistance state to a third resistance state; and a counter circuit, coupled to the control logic circuit, and configured to increment a count by one in response to the first memory cell's transition from the first to the second resistance state, and again increment the count by one in response to the first memory cell's transition from the second to the third resistance state.

In another embodiment, a circuit includes a memory array having a plurality of resistive random access memory (RRAM) cells; a control logic circuit, coupled to the memory array, and configured to use a first voltage signal to cause a first RRAM cell of the plurality of RRAM cells to transition from a first resistance state to a second resistance state; and a counter circuit, coupled to the control logic circuit, and configured to increment a count by one in response to the first RRAM cell's transition from the first to the second resistance state.

Yet in another embodiment, a method includes providing a memory cell that is in a first resistance state; transitioning the memory cell from the first resistance state to a second resistance state; incrementing a count of a counter by one in response to the memory cell's transition from the first to second resistance state; transitioning the memory cell from the second resistance state to a third resistance state; and again incrementing the count of the counter by one in response to the memory cell's transition from the second to third resistance state.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:
a memory array having a plurality of memory cells;
a control logic circuit, coupled to the memory array, and configured to use a first voltage signal to cause a first memory cell of the plurality of memory cells to transition from a first resistance state to a second resistance state, and a second voltage signal to cause the first memory cell to transition from the second resistance state to a third resistance state;
a counter circuit, coupled to the control logic circuit, and configured to increment a count by one in response to the first memory cell's transition from the first to the second resistance state, and again increment the count by one in response to the first memory cell's transition from the second to the third resistance state; and
an encryption circuit, coupled to the counter circuit, configured to generate an encrypted value using an updated count provided by the counter circuit.

2. The circuit of claim 1, wherein the plurality of memory cells each comprises a resistive random access memory (RRAM) cell.

3. The circuit of claim 1, wherein the first memory cell presents a substantially lower resistance value when the first memory cell transitions from the first resistance state to the second resistance state.

4. The circuit of claim 1, wherein the first memory cell presents a substantially lower resistance value when the first memory cell transitions from the second resistance state to the third resistance state.

5. The circuit of claim 1, wherein when the first memory cell transitions to the third resistance state, the first memory cell cannot transition back to either the first or second resistance states.

6. The circuit of claim 1, wherein the control logic circuit is further configured to use the first voltage signal to cause a second memory cell of the plurality of memory cells to transition from a respective first resistance state to a respective second resistance state.

7. The circuit of claim 6, wherein the counter circuit is further configured to increment the respective count by one in response to the second memory cell's transition from the respective first to the respective second resistance states.

8. The circuit of claim 1, wherein the first voltage signal is a positive value, and the second voltage signal is a negative value.

9. A circuit, comprising:
a memory array having a plurality of resistive random access memory (RRAM) cells;
a control logic circuit, coupled to the memory array, and configured to use a first voltage signal to cause a first RRAM cell of the plurality of RRAM cells to transition from a first resistance state to a second resistance state; and
a counter circuit, coupled to the control logic circuit, and configured to increment a count by one in response to the first RRAM cell's transition from the first to the second resistance state; and
an encryption circuit, coupled to the counter circuit, configured to generate an encrypted value using an updated count provided by the counter circuit.

10. The circuit of claim 9, wherein the control logic circuit is further configured to use a second voltage signal to cause the first RRAM cell to transition from the second resistance state to a third resistance state.

11. The circuit of claim 10, wherein the counter circuit is further configured to again increment the count by one in response to the first RRAM cell's transition from the second to the third resistance state.

12. The circuit of claim 10, wherein when the first RRAM cell transitions to the third resistance state, the first RRAM cell cannot transition back to either the first or second resistance state.

13. The circuit of claim 10, wherein the first RRAM cell presents a substantially lower resistance value when the first RRAM cell transitions from the second resistance state to the third resistance state.

14. The circuit of claim 9, wherein the first RRAM cell presents a substantially lower resistance value when the RRAM memory cell transitions from the first resistance state to the second resistance state.

15. The circuit of claim 9, wherein the control logic circuit is further configured to use the first voltage signal to cause a second RRAM cell of the plurality of RRAM cells to transition from a respective first resistance state to a respective second resistance state.

16. The circuit of claim 15, wherein the counter circuit is further configured to increment the respective count by a one in response to the second RRAM cell's transition from the respective first to the respective second resistance state.

17. A method, comprising:
providing a memory cell that is in a first resistance state;
transitioning the memory cell from the first resistance state to a second resistance state;
incrementing a count of a counter by one in response to the memory cell's transition from the first to second resistance state;
transitioning the memory cell from the second resistance state to a third resistance state;
again incrementing the count of the counter by one in response to the memory cell's transition from the second to third resistance state; and
generating an encrypted value using an updated count provided by the counter.

18. The method of claim 17, wherein when the memory cell transitions to the third resistance state, the memory cell cannot transition back to either the first or second resistance state.

19. The method of claim 17, wherein the memory cell comprises a resistive random access memory (RRAM) cell.

20. The method of claim 17, wherein when the memory cell transitions from the first resistance state to the second resistance state, the first memory cell presents a lower resistance value, and when the memory cell transitions from the second resistance state to the third resistance state, the memory cell presents an even lower resistance value.

* * * * *